United States Patent
Krah

(10) Patent No.: US 9,690,408 B1
(45) Date of Patent: Jun. 27, 2017

(54) ELECTRONIC DEVICE WITH AN INTEGRATED TOUCH SENSING AND FORCE SENSING DEVICE

(71) Applicant: Apple Inc., Cupertino, CA (US)

(72) Inventor: Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 14/498,556

(22) Filed: Sep. 26, 2014

(51) Int. Cl.
*G06F 3/041* (2006.01)

(52) U.S. Cl.
CPC ............ *G06F 3/0412* (2013.01); *G06F 3/041* (2013.01); *G06F 3/0414* (2013.01); *G06F 2203/04106* (2013.01)

(58) Field of Classification Search
CPC combination set(s) only.
See application file for complete search history.

(56) References Cited

U.S. PATENT DOCUMENTS

| | | | |
|---|---|---|---|
| 8,553,004 B2 | 10/2013 | Hotelling et al. | |
| 8,988,384 B2 | 3/2015 | Krah et al. | |
| 9,081,453 B2 | 7/2015 | Bulea et al. | |
| 2006/0144154 A1* | 7/2006 | Ueno | G01L 1/16 73/723 |
| 2009/0326833 A1 | 12/2009 | Ryhanen et al. | |
| 2011/0057899 A1* | 3/2011 | Sleeman | G01L 1/146 345/174 |
| 2011/0134059 A1* | 6/2011 | Paleczny | G06F 3/016 345/173 |
| 2012/0086666 A1 | 4/2012 | Badaye et al. | |
| 2014/0055407 A1* | 2/2014 | Lee | G06F 3/0416 345/174 |
| 2015/0084909 A1* | 3/2015 | Worfolk | G06F 3/0414 345/174 |

OTHER PUBLICATIONS

Bau, et al., "TeslaTouch: Electrovibration for Touch Surfaces," UIST'10, Oct. 3-6, 2010, New York, New York USA, 10 pages.
Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

* cited by examiner

*Primary Examiner* — Van Chow
(74) *Attorney, Agent, or Firm* — Brownstein Hyatt Farber Schreck, LLP

(57) ABSTRACT

An integrated touch sensing and force sensing device is included in an electronic device. The integrated touch sensing and force sensing device includes a force-sensitive layer operably attached to an input surface, a first electrode layer attached to a first surface of the force-sensitive layer, and a second electrode layer attached to a second surface of the force-sensitive layer. An analog front end processing channel is operable to process a touch signal that is based on a change in an electrical property between the first and second electrode layers and operable to process a force signal that is based on an electrical property generated by the force-sensitive layer based on a force applied to the input surface.

25 Claims, 12 Drawing Sheets

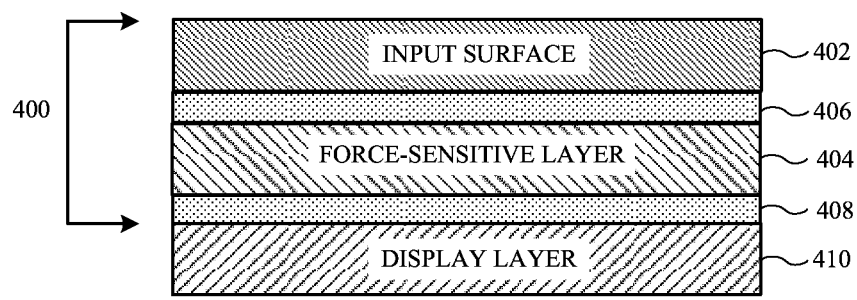
*FIG. 4*
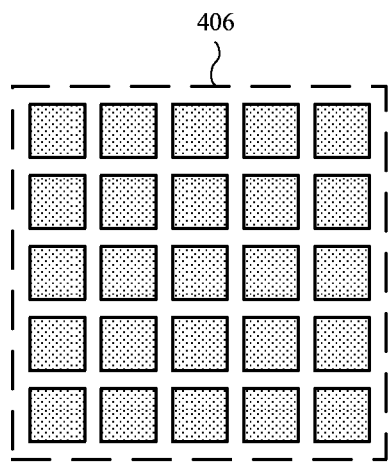 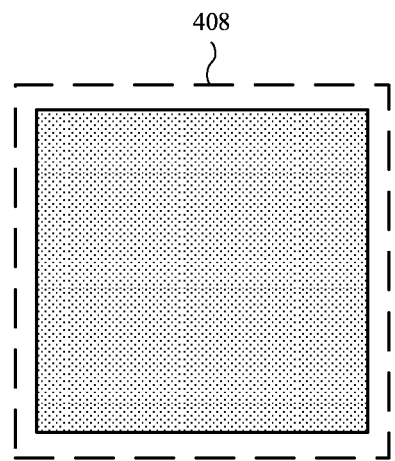
*FIG. 5*          *FIG. 6*

ELECTRONIC DEVICE WITH AN INTEGRATED TOUCH SENSING AND FORCE SENSING DEVICE

TECHNICAL FIELD

The present invention relates generally to electronic devices, and more specifically to an electronic device that includes an integrated touch sensing and force sensing device.

BACKGROUND

Touch displays have become increasingly popular in electronic devices. Smart phones, cell phones, tablet computers, notebook computers, and computer monitors, and so forth, are increasingly equipped with displays that are configured to sense touch as a user input. The touch may be sensed in accordance with one of several different touch sensing techniques including, but not limited to, capacitive touch sensing.

Touch sensitive devices generally provide position identification of where the user touches the device. A touch may include movement, gestures, and other effects related to position detection. For example, touch sensitive devices can provide information to a computing system regarding user interaction with a graphical user interface (GUI) of a display, such as pointing to elements, reorienting or repositioning elements, editing or typing, and other GUI features. In another example, touch sensitive devices can provide information to a computing system for a user to interact with an application program, such as relating to input or manipulation of animation, photographs, pictures, slide presentations, sound, text, other audiovisual elements, and so forth.

While the touch sensitive devices provide an input mechanism that provides an appearance that the user is interacting directly with element displayed in the GUI, the input is generally limited to the x-, y-positioning of the touch. In some cases, the input sensitivity has been increased to allow for multi-touch inputs, but this is still limited to positional constraints of the surface upon which the touch is sensed. Some applications and programs may benefit from additional input modes beyond that provided strictly by the touch sensing.

SUMMARY

In one aspect, an integrated touch sensing and force sensing device is included in an electronic device. The integrated touch sensing and force sensing device includes a force-sensitive layer attached to an input surface, a first electrode layer attached to a first surface of the force-sensitive layer, and a second electrode layer attached to a second surface of the force-sensitive layer. One or more analog front end (AFE) processing channels is operably connected to the integrated touch sensing and force sensing device. Each AFE processing channel is configured to process a touch signal that is based on a change in an electrical property between the first and second electrode layers and operable to process a force signal that is based on an electrical property generated by the force-sensitive layer based on a force applied to the input surface. In one embodiment, the force-sensitive layer is made of a piezoelectric material. The touch signal, for example, may be based on a change in a capacitance between the first and second electrode layers.

In some embodiments, an AFE processing channel may include a receiver AFE channel operably connected to one electrode layer in the integrated touch sensing and force sensing device. A touch processing channel and a force processing channel may each be operably connected to an output of the receiver AFE channel. A touch transmitter channel can be operably connected to the other electrode layer in the integrated touch sensing and force sensing device. In some embodiments, a servo/sigma delta analog-to-digital converter is included in the receiver AFE channel.

In some embodiments, a mechanical oscillator may be operably connected to the force-sensitive layer in the integrated touch sensing and force sensing device The mechanical oscillator may modulate the force applied to the force-sensitive layer. A separate demodulator channel can demodulate the amplitude modulated charge from the force-sensitive layer.

In some embodiments, a touch power management channel may be electrically connected to an output of the first analog-to-digital converter in the analog front end processing channel. The touch power management channel can receive signals from other analog front end channels. The power management channel can detect a force applied to the force-sensitive layer and in response enable a touch sensing operation.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

FIG. 4 is a simplified cross-section view of the electronic device taken along line 4-4 in FIG. 1;

FIGS. 5-10 depict various configurations of the first electrode layer 406 and the second electrode layer 408 shown in FIG. 4;

DETAILED DESCRIPTION

Embodiments herein are described in conjunction with a display in an electronic device that includes an integrated touch sensing and force sensing device. Other embodiments, however, are not limited to this implementation. An integrated touch sensing and force sensing device can be included in a different component in or connected to an electronic device. As one example, an integrated touch sensing and force sensing device can be incorporated into an enclosure of an electronic device. Additionally or alternatively, an integrated touch sensing and force sensing device can be included in an input device, such as a track pad or mouse.

Embodiments of the integrated touch sensing and force sensing device may be used with multi-touch enabled devices. The integrated touch sensing and force sensing device is adapted to resolve force on a touch sensing element basis. In some embodiments, a piezoelectric film is included in a touch sensing device and used to determine an amount of force applied to an input surface of the touch sensing device. The piezoelectric film can create a charge that is a function of the applied force due to the strain on the piezoelectric material. A touch processing channel and a force processing channel are operatively connected to the integrated touch sensing and force sensing device and may share circuitry that processes both touch and force inputs.

Figure 1:
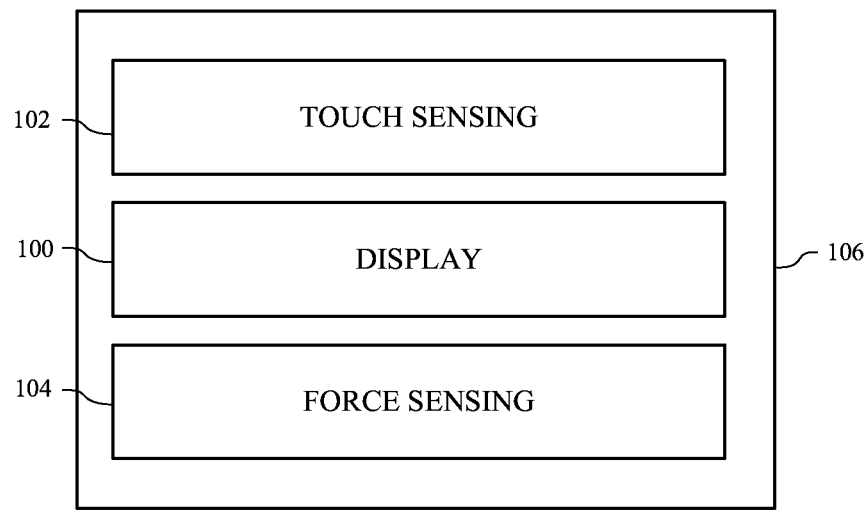
FIG. 1 is a conceptual cross-sectional view of a display screen that can be used for touch and force sensing operations.

Referring now to FIG. 1, there is shown a conceptual cross-sectional view of a display that can be used for touch and force sensing operations. The functions can include a display function 100, a touch sensing function 102, and a force sensing function 104. These functions can be performed in conjunction with the display 106. In other words, a user can interact with a viewable image on the display 106 with one or more touches, an applied force, or both touch and force. For example, a game that is displayed on the display 106 can receive touch inputs from a user. As another example, an application displayed on the display 106 can perform one function at one rate of speed when a user applies a small amount of force to the display and perform the function at a faster rate of speed when the user applies a greater amount of force to the display 106.

The touch sensing and force sensing functions can each use or share some or all of the display area. For example, in one embodiment, a user can interact with a displayed image by touching and/or by applying a force at an appropriate position on the display, with the appropriate position located anywhere on the display. In another embodiment, the display function 100 and the touch sensing function 102 can use the entire display 106 while the force sensing function 106 involves a portion of the display 106. Thus, each function can use some or all of the display 106 when in operation. The arrangement of the functions in FIG. 1 is for illustrative purposes only, and does not correspond to any layers or devices in the display or in an electronic device. Additionally, the arrangement of the functions does not correspond to the amount of area on the display used by each function.

Figure 2:
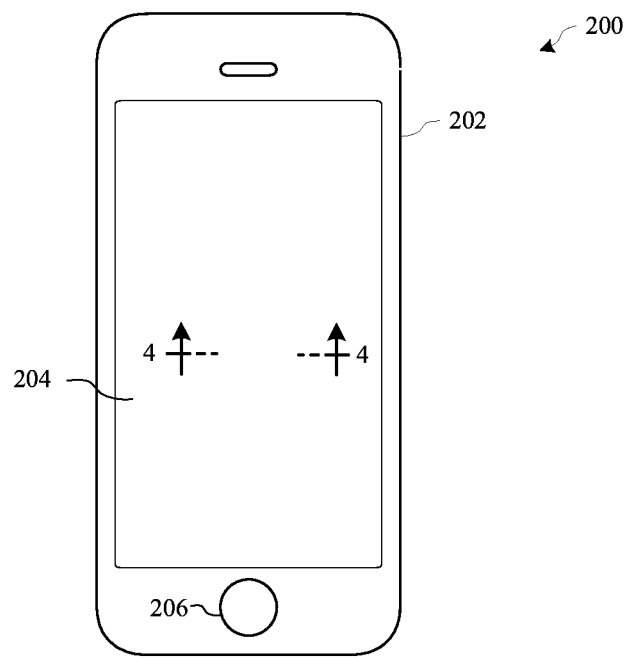
FIG. 2 is a front view of one example of an electronic device that can include an integrated touch sensing and force sensing device.

FIG. 2 is a front view of one example of an electronic device that can employ an integrated touch sensing and force sensing device. In the illustrated embodiment, the electronic device 200 is implemented as a smart telephone. Other embodiments can implement the electronic device differently, such as, for example, as a laptop computer, a tablet computing device, a wearable communication device, a digital music player, a kiosk, a remote control device, and other types of electronic devices that include an integrated touch sensing and force sensing device.

The electronic device 200 includes an enclosure 202 surrounding a display 204 and one or more buttons 206 or input devices. The enclosure 202 can form an outer surface or partial outer surface and protective case for the internal components of the electronic device 200, and may at least partially surround the display 204. The enclosure 202 can be formed of one or more components operably connected together, such as a front piece and a back piece. Alternatively, the enclosure 202 can be formed of a single piece operably connected to the display 204.

The display 204 can be implemented with any suitable display, including, but not limited to, a multi-touch sensing touchscreen device that uses liquid crystal display (LCD) technology, light emitting diode (LED) technology, organic light-emitting display (OLED) technology, or organic electro luminescence (OEL) technology.

The button 206 can take the form of a home button, which may be a mechanical button, a soft button (e.g., a button that does not physically move but still accepts inputs), an icon or image on a display, and so on. Further, in some embodiments, the button 206 can be integrated as part of a cover glass of the electronic device. Additionally or alternatively, the electronic device 200 can include other types of input devices. Example input devices include, but are not limited to, a microphone, a trackpad, a communication or network port, and one or more buttons.

Figure 3:
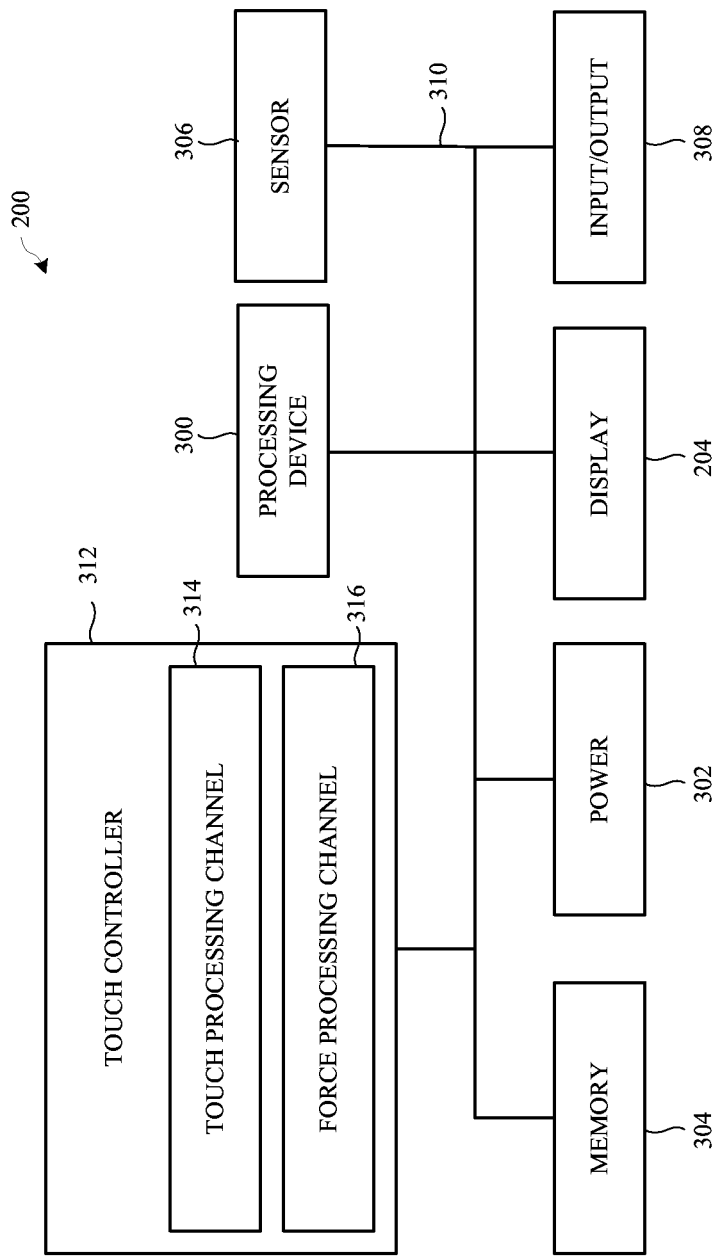
FIG. 3 is an example block diagram of the electronic device shown in FIG. 2.

Referring now to FIG. 3, there is shown an example block diagram of the electronic device 200 shown in FIG. 2. The electronic device 200 can include the display 204, a processing device 300, a power source 302, a memory or storage device 304, a sensor 306, and an input/output 308 (e.g., input/output device and/or an input/output port). The processing device 300 can control some or all of the operations of the electronic device 200. The processing device 300 can communicate, either directly or indirectly, with substantially all of the components of the electronic device 200. For example, a system bus or other communication mechanism 310 can provide communication between the processing device 300, the power source 302, the memory 304, the sensor 306, and/or the input/output 308.

The processing device 300 can be implemented as any electronic device capable of processing, receiving, or transmitting data or instructions. For example, the processing device 300 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

It should be noted that the components of the electronic device can be controlled by multiple processing devices. For example, select components of the electronic device 200 may be controlled by a first processing device and other components of the electronic device 200 may be controlled by a second processing device where the first and second processing devices may or may not be in communication with each other.

The power source 302 can be implemented with any device capable of providing energy to the electronic device 200. For example, the power source 302 may be one or more batteries or rechargeable batteries. Additionally or alternatively, the power source can be a power cord that connects the electronic device to another power source such as a wall outlet.

The memory 304 can store electronic data that can be used by the electronic device 200. For example, a memory can store electrical data or content such as, for example, audio and video files, documents and applications, device settings and user preferences, timing signals, control signals, and data structures or databases. The memory 304 can be configured as any type of memory. By way of example only, the memory can be implemented as random access memory, read-only memory, Flash memory, removable memory, or other types of storage elements, or combinations of such devices.

The electronic device 200 may also include one or more sensors 306 positioned substantially anywhere on the electronic device 200. The sensor(s) 306 can be configured to sense substantially any type of characteristic, such as but not limited to, pressure, light, touch, heat, movement, relative motion, biometric data, and so on. For example, the sensor(s) 306 may be a heat sensor, a position sensor, a light or optical sensor, an accelerometer, a pressure transducer, a gyroscope, a magnetometer, a health monitoring sensor, and so on. Additionally, the one or more sensors 306 can utilize any suitable sensing technology, including, but not limited to, capacitive, ultrasonic, resistive, optical, ultrasound, piezoelectric, and thermal sensing technology.

The input/output 308 can transmit and/or receive data from a user or another electronic device. The I/O device(s) can include a display, a touch sensing input surface such as a track pad, one or more buttons (e.g., button 206), one or more cameras, one or more microphones or speakers, one or more ports such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet.

A touch controller 312 includes touch processing channel 314 and force processing channel 316. The touch controller 312 is operably connected to the display 204. In particular, the touch controller 312 is configured to transmit and receive signals from the touch sensing and force sensing device included in the display 204. The touch processing channel 314 and the force processing channel 316 can share circuitry when processing signals received from the integrated touch sensing and force sensing device.

It should be noted that FIG. 1-3 are exemplary only. In other examples, the electronic device may include fewer or more components than those shown in FIGS. 1-3. Additionally, as described earlier, an integrated touch sensing and force sensing device may be incorporated into substantially any type of device. Additionally or alternatively, an integrated touch sensing and force sensing device can be included in any type of component within, or connected to an electronic device.

FIG. 4 is a simplified cross-section view of the electronic device taken along line 4-4 in FIG. 2. The integrated touch sensing and force sensing device 400 can include an input surface 402 and a force-sensitive layer 404. The input surface 402 may be an exterior surface, such as a cover glass disposed over the top surface of the electronic device. The input surface 402 is substantially transparent in the illustrated embodiment.

The force-sensitive layer 404 is disposed below the input surface 402. The force-sensitive layer 404 can be attached to the input surface 402 with an optically clear adhesive (not shown). The force-sensitive layer 404 is typically a compliant material that exhibits an electrical property that is variable in response to deformation or deflection of the layer. The force-sensitive layer may be formed from a piezoelectric, piezo-resistive, resistive, or other strain-sensitive materials. The force-sensitive layer 404 is a piezoelectric layer in the embodiments described herein. The piezoelectric layer generates a localized electric charge in response to a deformation of the piezoelectric layer.

A first electrode layer 406 is attached to a first surface of the force-sensitive layer 404 and a second electrode layer 408 is attached to an opposing second surface of the force-sensitive layer 404. In the illustrated embodiment, the electrodes can be formed from a transparent conductive material, such as an indium tin oxide (ITO). As will be described in more detail later, one electrode layer can be connected to drive circuitry that applies a stimulus signal to the electrode layer. Another electrode layer can be connected to sense circuitry capable of detecting one or more touches and an amount of electric charge generated by the piezoelectric layer 404.

A display layer 410 can be attached to the integrated touch sensing and force sensing device 400. The display layer may take a variety of forms, including as a liquid crystal display (LCD), a light-emitting diode (LED) display, an organic light-emitting diode (OLED) display, or the like, for generating images to be displayed by the electronic device. The display layer 410 can be coupled to the piezoelectric layer 404 and/or to the second electrode layer 408 by an optically clear adhesive (not shown). Since the materials above the display layer 410 may be formed from transparent materials, images generated by the display layer 410 can be viewed through the materials positioned above the display layer.

In the illustrated embodiment, a touch sensing device is formed by the first and second electrodes 406, 408. The touch sensing device can detect touch using any suitable sensing technology. Example touch sensing technologies include, but are not limited to, capacitive, ultrasound, resistive, and optical sensing technologies. As one example, the integrated touch sensing and force sensing device 400 can detect one or more touches based on capacitance differences between a finger and an electrode layer, or based on capacitance differences between the first and second electrode layers 406, 408. Sense circuitry connected to one electrode layer is scanned to measure a capacitance between the first and second electrode layers.

For force detection, as a user applies a downward force on the input surface 402, the input surface 402 can deform by an amount corresponding to an amount of the applied force. The deformation of the input surface 402 may cause a corresponding deformation in the piezoelectric layer 404. The piezoelectric layer 404 can then generate an amount of electric charge based on the amount of deformation of the layer. The generated electric charge may be received by the sense circuitry via the electrode layer attached to the sense circuitry. Since the amount of electric charge generated by the piezoelectric layer 404 can be representative of the amount of deformation of the piezoelectric layer, and because the amount of deformation of the piezoelectric layer may be representative of the force applied to the input surface 402, the amount of electric charge detected by the sense circuitry can be representative of the force applied to the input surface 402. In this way, the sense circuitry can be used to detect an amount of force applied to the input surface 402.

The first and second electrode layers 406, 408 may each include a single electrode or multiple electrodes. FIGS. 5-10 depict various configurations of the first electrode layer 406 and the second electrode layer 408 shown in FIG. 4. In FIGS. 5 and 6, the second electrode layer 408 extends along the surface of the piezoelectric layer 404 and may have a shape that substantially matches the shape of the piezoelectric layer 404. The first electrode layer 406 includes multiple discrete electrodes extending along the surface of the piezoelectric layer 404. While FIG. 5 shows the first electrode layer 406 having twenty-five discrete electrodes arranged in rows and columns, the first electrode layer 406 can have any number of discrete electrodes having any desired shape and arranged in any given pattern. When the first electrode layer is patterned into discrete electrodes, the location or locations of a touch on the input surface 402 can be determined. Additionally, the location and the amount of force applied to the input surface 402 can be determined.

When the first and second electrodes are configured as shown in FIGS. 5 and 6, the first electrode layer 406 is the sense layer and a reference voltage (e.g., ground) is applied to the second electrode layer 408. A self-capacitance analog front end processing channel can be used in conjunction with the first electrode layer shown in FIG. 5, with the second electrode layer 408 acting as the ground return for the force sensing device. In some embodiments, the first electrode layer 406 shown in FIG. 5 may be implemented into the $V_{COM}$ layer of a display, such as the $V_{COM}$ layer in an in-cell touchscreen display. Additionally, the force-sensitive layer 404 (FIG. 4) may replace the layer in the in-touch touchscreen display stack that is adjacent to the $V_{COM}$ layer to form an in-cell touch and force sensor.

Figure 7:
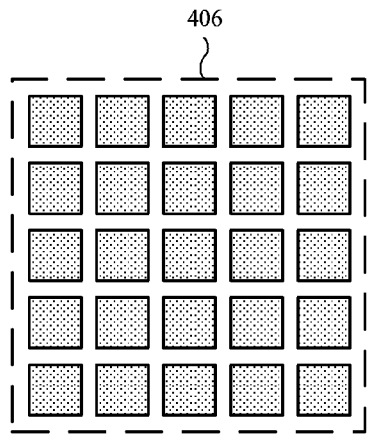
Figure 8:
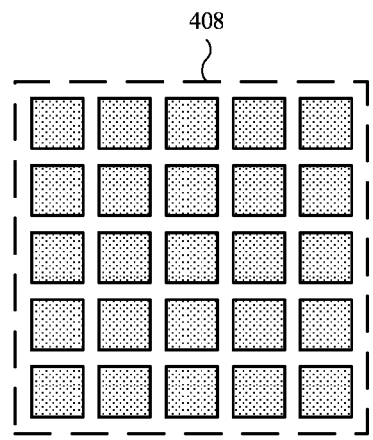

Both the first and second electrode layers 406, 408 include multiple discrete electrodes in FIGS. 7 and 8. The discrete electrodes can extend along the surfaces of the piezoelectric layer 404. Again, while FIGS. 7 and 8 show the first and second electrode layers 406, 408 each having twenty-five discrete electrodes arranged in rows and columns, the first and second electrode layers can each have any number of discrete electrodes having any desired shape and arranged in any given pattern. When the first and second electrode layers are patterned into discrete electrodes, the location of multiple touches on the input surface 402 can be determined. Additionally, the location and the amount of multiple forces applied to the input surface 402 can be determined.

When the first and second electrodes are configured as shown in FIGS. 7 and 8, the discrete electrodes in one electrode layer (e.g., the first electrode layer 406) are the sense electrodes and a reference voltage (e.g., ground) is applied to the discrete electrodes in the other electrode layer (e.g., the second electrode layer 408). Similar to FIG. 5, a self-capacitance analog front end processing channel can be used in conjunction with the sense electrodes (e.g., the first electrode layer) with the other electrode layer (e.g., the second electrode layer) acting as a per electrode ground return for the force sensing device.

Figure 9:
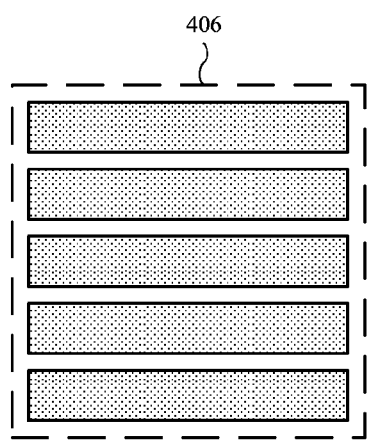
Figure 10:
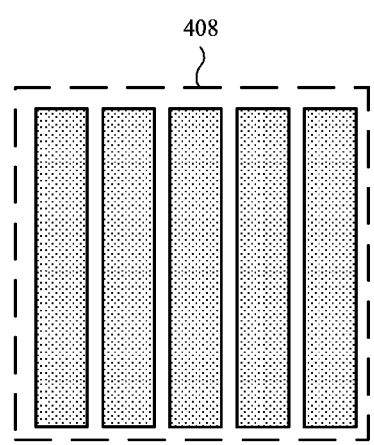

In FIGS. 9 and 10, the first electrode layer 406 may be patterned into discrete rows of electrodes. The second electrode layer 408 can be patterned into discrete columns of electrodes. The first and second electrode layers 406, 408 are used in a mutual capacitance mode. Charge between the electrode rows and the electrode columns can be measured at each intersection of an electrode row and an electrode column. When the first and second electrodes are patterned into discrete electrodes, the location of multiple touches on the input surface 402 can be determined. Additionally, the location and the amount of multiple forces applied to the input surface 402 can be determined. While FIGS. 9 and 10 show the first and second electrode layers each having five rectangular discrete electrodes arranged in rows and columns, respectively, in other embodiments the first and second electrode layers can have any number of discrete electrodes having any desired shape and arranged in any given pattern.

The display layer 410 is not included in those embodiments that include an integrated touch sensing and force sensing device in a component other than in the display, such as in an enclosure, an input device (e.g., button or a track pad). In one embodiment, a substrate (not shown) may be disposed below the sense layer. The substrate may be substantially any support surface, such as a portion of a printed circuit board, the enclosure, or the link. Additionally, the substrate may be configured to surround or at least partially surround one or more sides of the integrated touch sensing and force sensing device.

Figure 11:
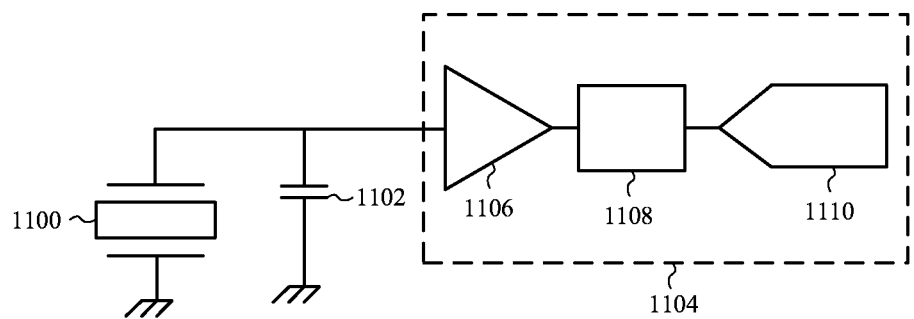
FIG. 11 is a simplified schematic diagram of a first analog front end (AFE) processing channel that may be operably connected to a force-sensitive layer of an integrated touch sensing and force sensing device.

Referring now to FIG. 11, a simplified schematic of an analog front end (AFE) processing channel is shown. In one embodiment, one or more AFE processing channels is operably connected to an integrated touch sensing and force sensing device 1100. An AFE processing channel can include an integration capacitor 1102 and an AFE 1104. In the illustrated embodiment, the AFE 1104 includes an amplifier 1106, a low-pass filter 1108, and a nyquist ADC 1110 (e.g., SAR or similar). In some embodiments, the integration capacitor 1102 can be sufficiently large in size to make implementing the capacitor into an ASIC impractical. Therefore, in some embodiments, the integration capacitor 1102 and the AFE 1104 in FIG. 11 can be replaced with a sigma-delta ADC 1200 (see FIG. 12). Instead of accumulating the charge by the integration capacitor 1302, charge is continuously digitized and digitally accumulated using sigma-delta techniques. The sigma-delta ADC includes the functions of the low-pass filter 1108 shown in FIG. 11. The quantizer in the sigma-delta ADC can have lower resolution than that of the ADC 1110 while not compromising dynamic range. While the quantizer resolution is smaller, and thus its quantization noise is higher than that of the nyquist ADC 1110, the quantization noise is shaped by the feedback loop in the sigma-delta ADC and pushed toward higher frequencies at 6 dB per octave, for example, for a $1^{st}$ order sigma delta ADC. The decimation filter performs the digital accumulation function while removing the shaped quantization noise, which can improve the dynamic range of the measurement.

In some embodiments, a first charge is obtained when a force is applied to the piezoelectric layer, and second charge is obtained when the force on the piezoelectric layer is released. The second charge has a polarity that is opposite to the polarity of the first charge. Thus, integration of the charge may be needed to determine the full or absolute force applied to the piezoelectric layer ($F(t)=1/\alpha \int Q(t)dt$).

In one embodiment, sigma-delta ADC 1200 can be a first order sigma-delta ADC. In another embodiment sigma-delta ADC 1200 can be a second or higher order sigma-delta ADC. Additionally, components other than the components shown in FIG. 12 may be included in an analog front end processing channel.

Figure 12:
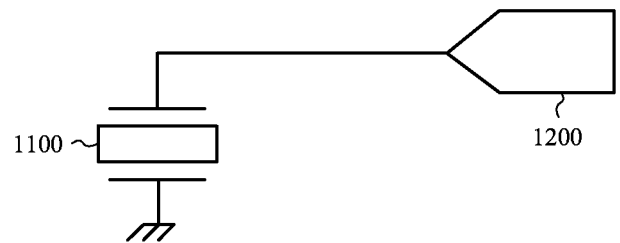
FIG. 12 is a simplified schematic diagram of a second analog front end processing channel that may be operably connected to a force-sensitive layer of an integrated touch sensing and force sensing device.
Figure 13:
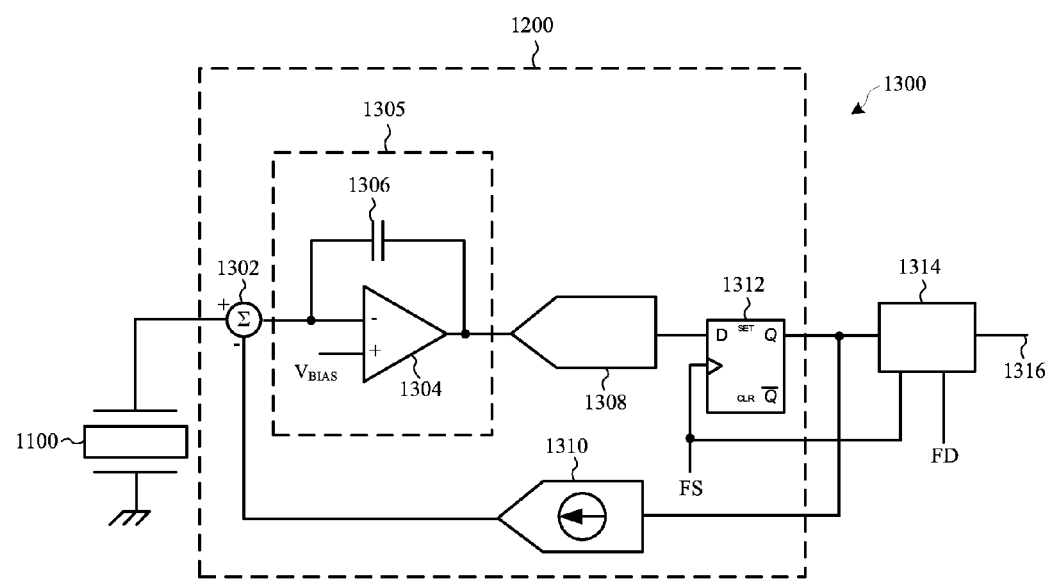
FIG. 13 depicts an example schematic diagram of the sigma delta analog-to-digital converter 1200 shown in FIG. 12.

FIG. 13 depicts an example schematic diagram of the sigma delta analog-to-digital converter 1200 shown in FIG. 12. The analog front end processing channel 1300 includes a summing circuit 1302 operably connected to the piezoelectric layer in the integrated touch sensing and force sensing device 1100, and an input of an amplifier 1304 operably connected to an output of the summing circuit 1302. The other input of the amplifier 1304 is operably connected to a bias voltage. A feedback capacitor 1306 is connected between an output of the amplifier 1304 and the input of the amplifier. Amplifier 1304 and capacitor 1306 form an integrator 1305. An input of an analog-to-digital converter (ADC) 1308 is operably connected to the output of the amplifier 1304. An input of a feedback current digital-to-analog converter (DAC) 1310 is operably connected to the output of a flip flop 1312, and an output of the feedback current DAC 1310 is operably connected to an input of the summing circuit 1302. An input of the flip-flop 1312 (e.g., D input) is operably connected to the output of the ADC 1308. The clock (CLK) input of the flip-flop 1312 is connected to a sample clock signal FS. Although only one flip-flop 1312 is shown in FIG. 13, embodiments can use one or more flip-flops. The number of flip-flops included in the sigma delta ADC 1200 may be dependent upon the resolution of the ADC 1308. For example, when the ADC is a 1-bit ADC, a single flip flop can be used. As another example, when an N-bit ADC is used, and N is greater than one, $2^{N-1}$ flip flops may be used.

The output of the flip-flop 1312 can be connected to a decimation filter 1314. The decimation filter can be an N+1 order decimation filter, where N is the order of the sigma delta ADC. In some embodiments, the decimation filter can be a Cascaded Integrator Comb (CIC) or FIR type decimation filter. The ADC 1308 and the feedback current DAC 1310 can each have resolutions of one or more bits.

Charge from the piezoelectric layer in the integrated touch sensing and force sensing device 1100 is received by the integrator 1305, which integrates the charge. The signal output from the integrator 1305 is converted to a digital signal by the ADC 1308. The feedback current DAC 1310 converts the digital signal to an analog signal and the summing circuit 1302 subtracts the analog signal from the charge signal received from the piezoelectric layer. Thus, the amplifier 1304 integrates the charge received from the piezoelectric layer in the integrated touch sensing and force sensing device 1100.

The ADC 1308 introduces a quantization error Q/SQRT(12), where Q is the least significant bit (LSB) size of the ADC. The quantization noise is shaped by the feedback loop of the sigma-delta ADC. The transfer function from the point of the ADC's quantization noise to the output includes the integrator in negative feedback configuration, such that the overall frequency response from the perspective of the quantization noise is that that of a high-pass filter of the same order as the integrator. Therefore, the quantization noise is pushed toward higher frequencies at 6 dB/octave for a first order sigma-delta ADC. The decimation filter 1314 filters out some (e.g., a majority) of the quantization noise, leading to a result on signal line 1316 that is proportional to the total integrated charge. The total integrated charge can then be correlated to force.

Figure 14:
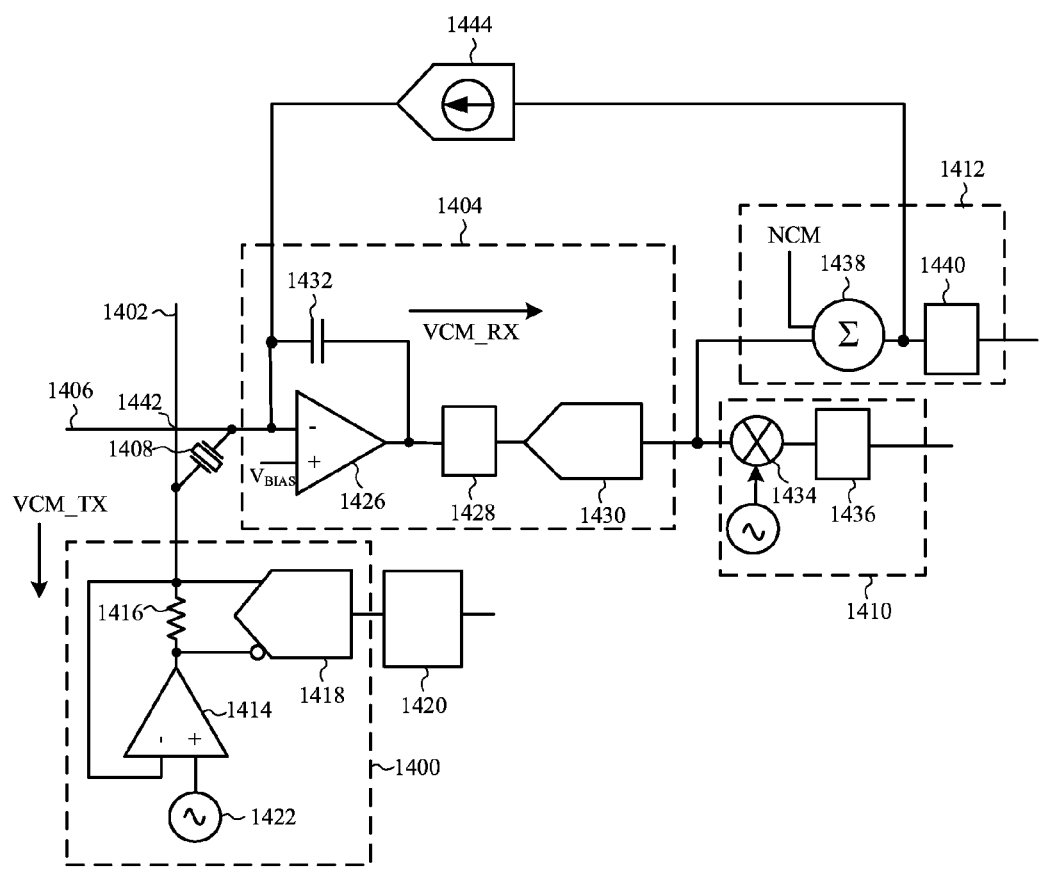
FIG. 14 is a simplified schematic diagram of a first processing channel shared by the integrated touch sensing and force sensing device.

Referring now to FIG. 14, there is shown a simplified schematic diagram of a first processing channel shared by the integrated touch sensing and force sensing device. Force is detected by measuring a relative charge (dQ=α·dF) in the illustrated embodiment. A touch transmitter channel 1400 is connected to a discrete electrode 1402 (e.g., a row electrode). When the electrode layer is patterned into discrete electrodes, each discrete electrode may be connected to a touch transmitter channel, or groups of discrete electrodes can be connected to a touch transmitter channel.

A receiver analog front end (AFE) channel 1404 is connected to the other electrode layer 1406 (e.g., a column electrode). As described earlier, the row and column electrodes 1402, 1406, respectively, are connected to different surfaces of the piezoelectric layer 1408. In the illustrated embodiment, the electrode 1402 is a drive electrode (e.g., included in electrode layer 408) and the electrode 1406 is the sense electrode (e.g., included in electrode layer 406). Other embodiments can use the electrode 1402 as the sense electrode and electrode 1406 as the drive electrode.

A touch processing channel 1410 receives the output signal from the receiver analog front end channel 1404. A force processing channel 1412 also receives the output signal from the receiver analog front end channel 1404.

The touch transmitter channel 1400 includes an amplifier 1414 connected to a resistor 1416. The resistor 1416 is connected to the drive electrode 1402. An ADC 1418 can digitize the voltage across resistor 1416. The ADC 1418 can be a first or higher order sigma-delta ADC, a SAR ADC, or another type of ADC. A decimation filter and error correction circuit 1420 is connected to an output of the ADC 1418. A stimulation signal circuit 1422 is provided to the input of the amplifier 1414. As a non-limiting example, the stimulation signal circuit 1422 can be implemented with a numerically controlled oscillator. When a touch sensing operation is to be performed, the stimulation signal circuit 1422 is applied to the drive electrode 1402 and an electrical property (e.g., a capacitance) on the sense electrode 1406 is sensed.

The receiver AFE channel 1404 includes an amplifier 1426 connected to an anti-aliasing filter 1428. An input of an ADC 1430 is connected to the output of the anti-aliasing filter 1428. An input of the amplifier 1426 is connected to the sense electrode 1406. A feedback capacitor 1432 is connected between an output of the amplifier 1426 and the input of the amplifier 1426.

The touch processing channel 1410 includes a demodulator 1434 connected to an accumulator 1436. The force processing channel 1412 includes an error comparator 1438 and a decimation filter and error correction circuit 1440. The output of the ADC 1430 (representing column force results) is input into the error comparator 1438. In the embodiment shown in FIG. 14, the receiver AFE channel 1404 is shared for touch data, force data, touch sensing, and force sensing. Composite touch and force signals output from the receiver AFE channel 1404 are processed separately by the touch processing and force processing channels 1410 and 1412, respectively.

When a force is applied to an input surface of the integrated touch sensing and force sensing device, charge from the piezoelectric layer 1408 is measured on the drive electrode 1402 and on the sense electrode 1406. For the drive electrode 1402, the amplifier 1414 receives charge from the piezoelectric layer 1408. The voltage VCM_TX across the resistor 1416 represents the force on the intersection 1442 of the row-column electrodes (VCM_TX=−f(Qpiezo)). The output 1424 of the decimation filter and error correction circuit 1420 represents the row force result. For the sense electrode 1406, the amplifier 1426 receives charge from the piezoelectric layer 1408. The common mode output range VCM_RX of the charge amplifier represents the force on the intersection 1442 of the row-column electrodes (VCM_RX=−f(Qpiezo)).

In the illustrated embodiment, the force sensing channel 1412 is comprised of the error comparator 1438 and the decimation filter and error correction circuit 1440. The error comparator 1438 computes a common mode correction which is the difference between the measured common mode level and the desired common mode level NCM. The error comparator 1438 can have provisions to sample the signal from the receiver AFE channel 1404 at the zero crossing of the touch signal at the common mode point (in the absence of external noise). A digital common mode correction value is then converted to an analog current by a feedback current DAC 1444. The analog correction current is applied to the inverting input of amplifier 1426 opposite that of the piezoelectric current into amplifier 1426 to maintain the output common mode of amplifier 1426. The feedback current DAC 1444 can be a R2R, C2C, sigma-delta DAC, or similar DAC. The common mode correction value is therefore directly related to the amount of piezoelectric current plus any parasitic currents (e.g. amplifier leakage current). The decimation filter and error correction circuit 1440 decimates the common mode correction value, and therefore the output of the decimation filter and error correction circuit 1440 is related to the force measurement. A subsequent processing block (not shown) can compensate for errors in the force measurement associated with, for example, leakage in the amplifier. In essence, the receiver AFE channel 1404, the force processing channel 1412, and the feedback current DAC 1444 form a sigma delta ADC, whose loop bandwidth is a function of the transconductance of the feedback current DAC 1444 and the integrator capacitor 1432. The loop-bandwidth is adjusted to prevent saturation of the charge amplifier while providing attenuation of interferers above the loop-bandwidth of the sigma-delta ADC. The decimation filter and error correction circuit 1440 may be optimized to filter out undesired interferers above the loop-bandwidth of the sigma-delta ADC.

Figure 15:
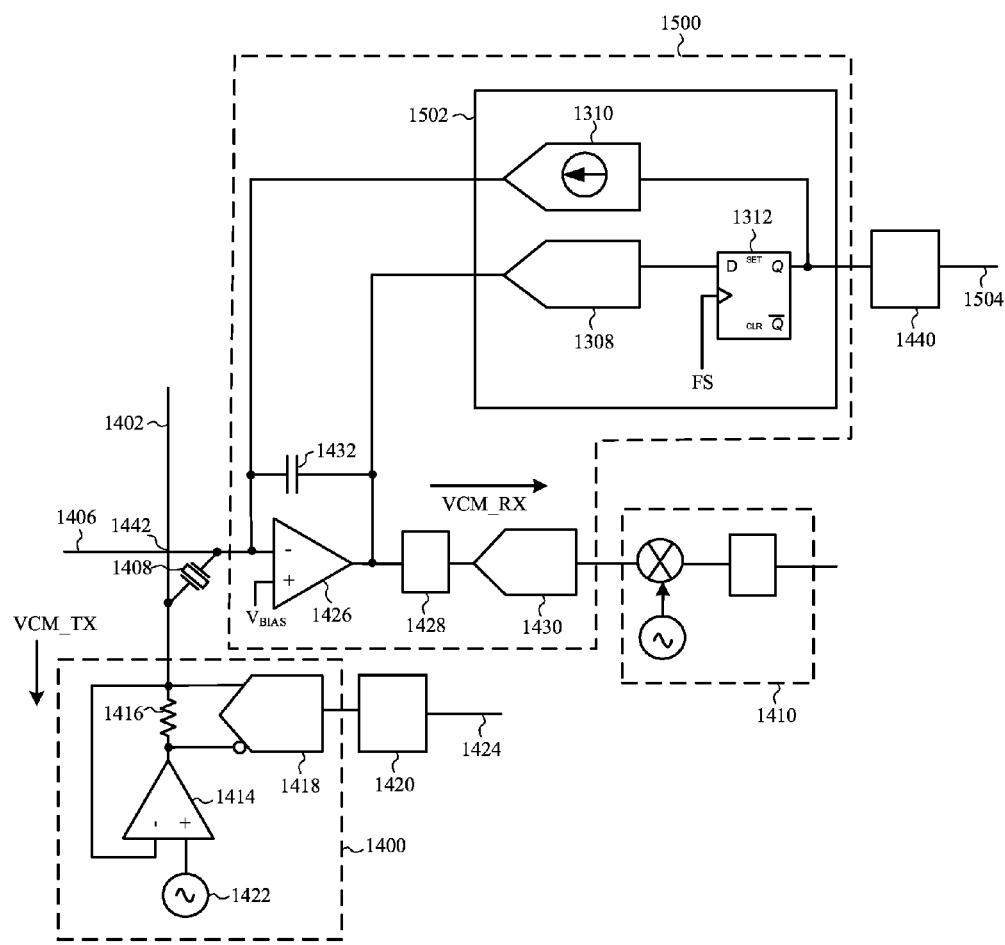
FIG. 15 is a simplified schematic diagram of a second processing channel shared by the integrated touch sensing and force sensing device.

FIG. 15 is a simplified schematic diagram of a second processing channel shared by the integrated touch sensing and force sensing device. Like the FIG. 14 embodiment, the illustrated embodiment detects force by measuring a relative charge ($dQ = \propto \cdot dF$). In the illustrated embodiment, the touch transmitter channel 1400 and the touch processing channel 1410 are similar to the touch transmitter channel and the touch processing channel shown in FIG. 14, and therefore will not be described in more detail herein. A receiver AFE channel 1500 can be connected to the sense electrode 1406. The touch processing channel 1410 receives the output signal from the receiver AFE channel 1500.

The receiver AFE channel 1500 is similar to the receiver AFE channel 1404 in FIG. 14 with the exception of the servo/sigma delta ADC 1502. The servo/sigma delta ADC 1502 is built around the charge amplifier 1426. The servo/sigma delta ADC 1502 processes the touch signal from sense electrode 1406 and serves as the integrator of the sigma-delta ADC (see amplifier 1304 and feedback capacitor 1306 in FIG. 13). Summing node 1302 is represented by the connection from block 1502 to the inverting input of 1426, and ADC 1308, flip-flop 1312, and the feedback current DAC 1310 are included in block 1502.

The servo/sigma delta ADC 1502 maintains the amplifier common mode relative to the touch stimulation signal circuit 1422. Therefore, the output 1504 of the decimation filter and error correction circuit 1440 represents the low frequency piezoelectric and leakage charge that is directly related to the force applied to the piezoelectric layer in the integrated touch sensing and force sensing device 1408. The bandwidth of the sigma delta ADC 1502 is sufficiently low so as to not interfere with touch operations. The sampling rate FS of the sigma-delta ADC 1502 is selected as to be below the minimum touch stimulation signal frequency and to be correlated to the touch stimulation signal circuit 1422 to prevent noise injection into the touch processing channel 1410. An advantage of the embodiment in FIG. 15 is that ADC 1430 and subsequent touch processing channel 1410 need not be active for force detection, which can save power compared to the embodiment in FIG. 14. Furthermore, the force measurement can be used as a wake-up mechanism for touch sensing operations. For example, the circuitry related to only touch processing can be in an off or low power state. As one example, the demodulator 1434 and the accumulator 1436 in FIG. 14 can be in an off or low power state. When a force signal equals or exceeds a given threshold value, the touch processing circuitry needed for touch processing can be activated or enabled.

In response to an applied force, the amplifier 1414 and the amplifier 1426 both receive charge from the piezoelectric layer in the integrated touch sensing and force sensing device 1408. The voltage VCM_TX across the resistor 1416 represents the force on the intersection 1442 of the row-column electrodes (VCM_TX=−f(Qpiezo)). The output 1424 of the sigma delta ADC 1418 and the decimation filter and error correction circuit 1420 represents the row force result. The common mode output range VCM_RX of the amplifier 1426 represents the force on the intersection 1442 of the row-column electrodes (VCM_RX=f(Qpiezo)). The output 1504 of the servo/sigma delta ADC 1502 and the decimation filter and error correction circuit 1440 represents the column force result.

Figure 16:
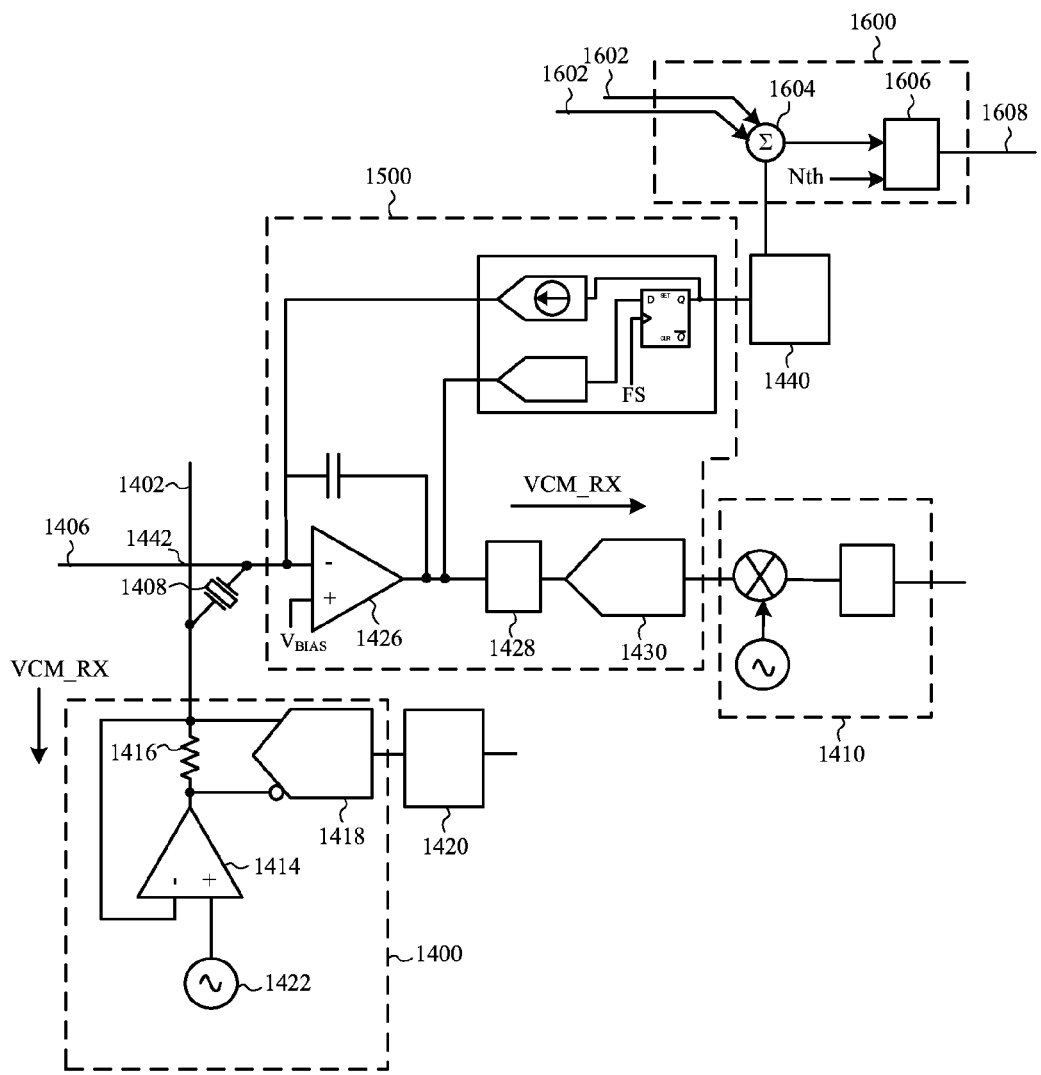
FIG. 16 is a simplified schematic diagram of a third processing channel shared by the integrated touch sensing and force sensing device.

In some embodiments, a detected force can be used to enable a touch sensing operation. FIG. 16 is a simplified schematic diagram of a third processing channel shared by the integrated touch sensing and force sensing device. A force is detected by measuring a relative charge ($dQ = \propto \cdot dF$) in the embodiment of FIG. 16. The voltage VCM_RX across the resistor 1416 represents the force on the intersection 1442 of the row-column electrodes (VCM_RX=f(Qpiezo)).

The receiver AFE channel (including amplifier 1426, AAF 1428, and ADC 1430) and the touch processing channel 1410 are similar to the receiver AFE channel and the touch processing channel shown in FIG. 15, and will not be described in more detail. A touch power management channel 1600 is connected to an output of the servo/sigma delta ADC 1502. The touch power management channel 1600 receives other force results (e.g., from block 1420 and/or block 1440) on signal line(s) 1602. A summing circuit 1604 sums the signals and the summed signals are received by a comparator 1606. The output 1608 of the comparator may be used to enable a touch sensing operation. The power management channel 1600 can detect a force applied to the piezoelectric layer of the integrated touch sensing and force sensing device 1408 and use the touch detection for improved touch latency and power management.

Figure 17:
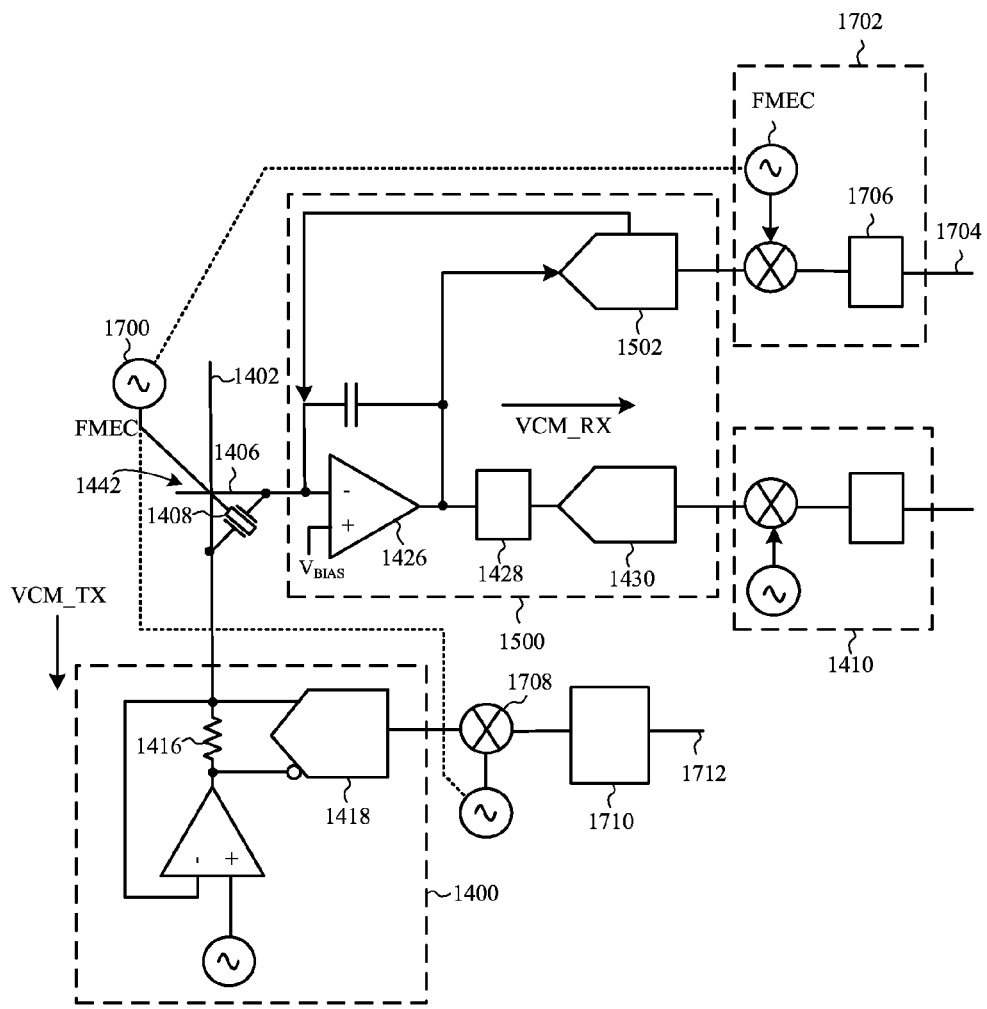
FIG. 17 is a simplified schematic diagram of a fourth processing channel shared by the integrated touch sensing and force sensing device.

FIG. 17 is a simplified schematic diagram of a fourth processing channel shared by the integrated touch sensing and force sensing device. Unlike the embodiments shown in FIGS. 14-16, the embodiment shown in FIG. 17 is configured to measure the absolute charge ($Q(F) = \propto \cdot (F_0 \cdot \sin(\omega_{MEC} \cdot t) + F_{OFFSET})$). In the illustrated embodiment, the touch transmitter channel 1400 and the touch processing channel 1410 are similar to the touch transmitter channel and the touch processing channel in FIG. 14. The receiver AFE channel 1500 is similar to the receiver AFE channel 1500 in FIG. 15. Therefore, these channels will not be described in more detail herein.

The piezoelectric layer of the integrated touch sensing and force sensing device 1408 is modulated with a force displacement signal FMEC produced by a mechanical oscillator 1700. The amplitude of the FMEC signal modulates the force applied to the piezoelectric layer. The voltage VCM_TX across the resistor 1416 represents the force on the intersection 1442 of the row-column electrodes (VCM_RX=−f(Qpiezo)). The common mode output range VCM_RX of the amplifier 1426 represents the force on the intersection 1442 of the row-column electrodes (VCM_RX=f(Qpiezo)).

A separate demodulator channel 1702 demodulates the amplitude modulated charge from the piezoelectric layer in the integrated touch sensing and force sensing device 1408. The output 1704 of the integrator 1706 represents the charge or force on the sense electrode 1406. The output from the sigma delta converter 1418 in the touch transmitter channel 1400 is processed by the demodulator 1708 and the integrator 1710, and the output 1712 represents the charge or force on the drive electrode 1402.

The embodiment shown in FIG. 17 may also be used to provide tactile or haptic feedback. The mechanical oscillator 1700 can be amplitude modulated based on the user input applied to the integrated touch sensing and force sensing device. For example, pressing a button on an on-screen keyboard may be used to modulate the amplitude of the mechanical oscillator 1700 to produce haptic feedback.

In the embodiments shown in FIGS. 14-17, the output that represents the force on the drive electrode 1402 and the output that represents the force on the sense electrode 1406 can be processed by a processing device (e.g., processing device 300) to correlate the output signal to a value that represents the force. Similarly, the outputs from the touch processing channels that represent the touch may be processed by a processing device.

Figure 18:
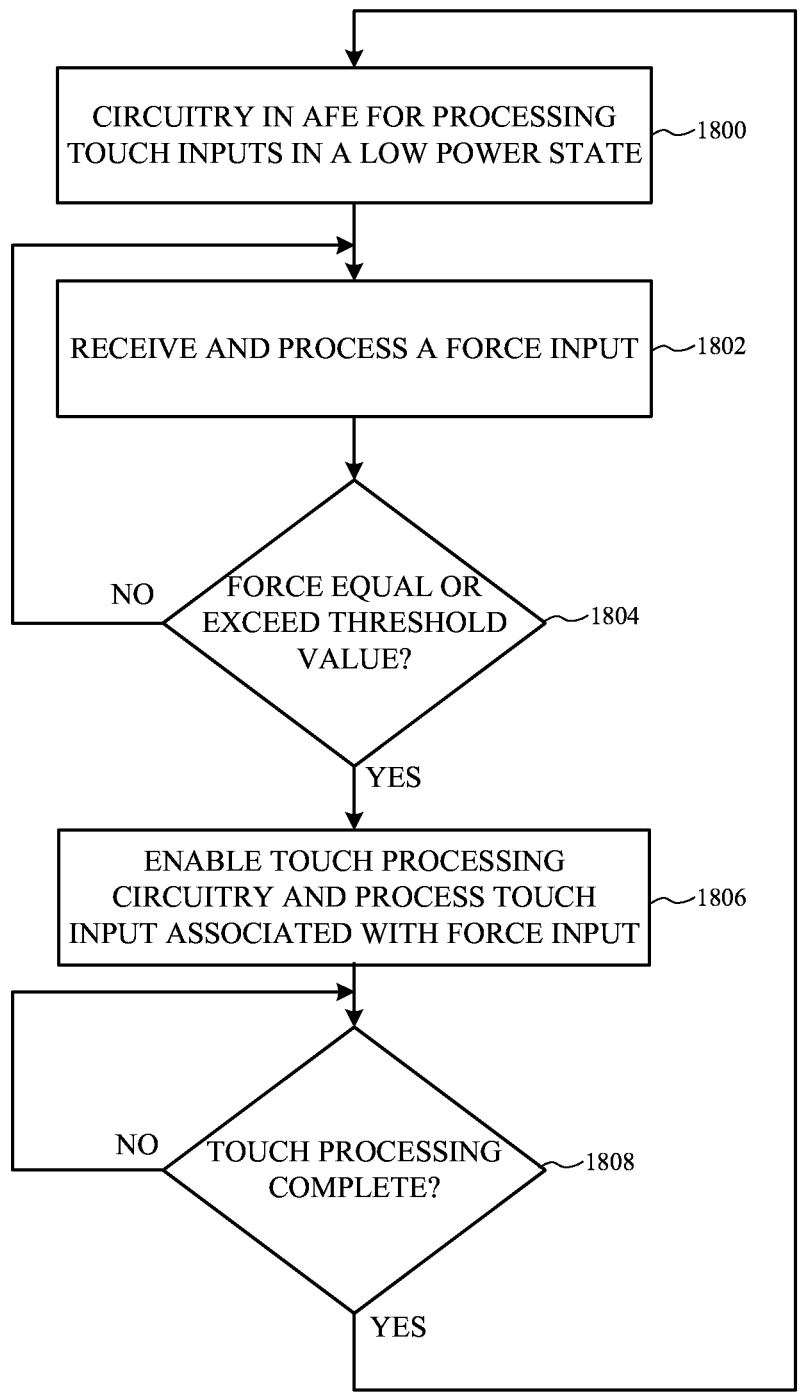
FIG. 18 is a flowchart of a method of power management in an integrated touch sensing and force sensing device.

Referring now to FIG. 18, a flowchart of a method of power management in an integrated touch sensing and force sensing device is shown. Initially, some or all of the circuitry associated only with processing touch inputs may be in an off or low power state (block 1800). As described earlier, the demodulator 1434 and the accumulator 1436 in FIG. 14 can be in an off or low power state at block 1800. A force input is then received and processed by the receiver AFE channel at block 1802. Next, as shown in block 1804, a determination can be made as to whether or not the force signal equals or exceeds a given threshold value. If not, the process returns to block 1802. If the force signal equals or exceeds the given threshold value, the method passes to block 1806 where the circuitry associated with processing touch inputs is enabled and the touch input or inputs associated with the force input is processed by the receiver AFE channel and the touch processing channel. A determination may then be made at block 1808 as to whether or not processing of the touch input(s) is complete. If not, the process waits at block 1808. If processing of the touch input(s) is complete, the method returns to block 1800.

When the electrodes 406 and 408 are configured as shown in FIGS. 9 and 10, force inputs can be acquired using projection scanning, where force inputs are acquired on M columns and N rows. Superimposing the row and column results yields M×N results. However, phantom touch inputs may occur if more than one touch input is applied to the integrated touch sensing and force sensing device. For example, if an integrated touch sensing and force sensing device with four rows (enumerated rows 0 to 3) and four columns (enumerated columns 0 to 3) is used and touch inputs are applied at locations (1,1) and (2,2), phantom images may be induced at locations (1,2) and (2,1) and the location of the force inputs cannot be resolved. However, the location of the touch inputs can be resolved by using the touch signals. Therefore during processing, force inputs can be related to touch signals.

Figure 19:
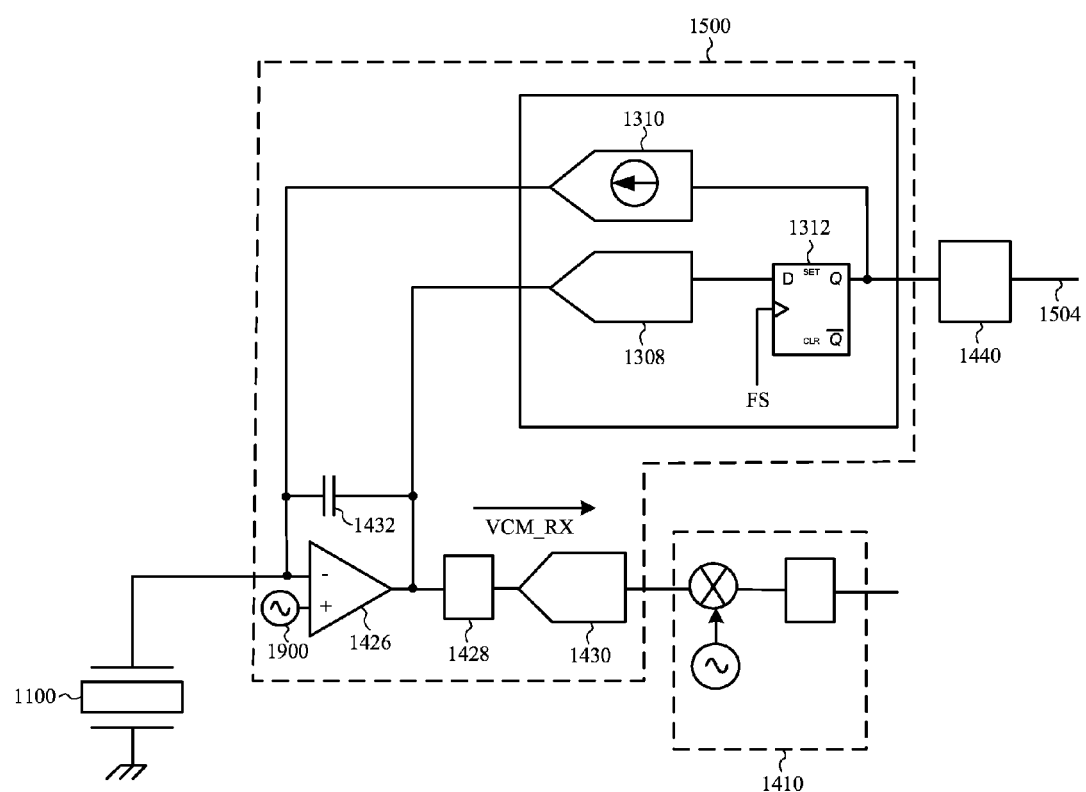
FIG. 19 is a simplified schematic diagram of a fifth processing channel shared by the integrated touch sensing and force sensing device.

FIG. 19 is a simplified schematic diagram of a fifth processing channel shared by the integrated touch sensing and force sensing device. The FIG. 19 embodiment employs self-capacitance measurement rather than mutual capacitance measurement used in the embodiments shown in FIGS. 14-17. In the embodiment shown in FIG. 19, a stimulation signal circuit $V_{STIM}$ is applied to the non-inverting input of the amplifier 1426, and the output of amplifier 1426 is a function of the capacitance of the integrated touch sensing and force sensing device 1100 and the feedback capacitance as follows: Vout=$V_{STIM}$*(1+Cpiezo/Cf), where $V_{STIM}$ is the amplitude of the stimulation signal, Cf is the feedback capacitance, Cpiezo is the capacitance of the integrated touch sensing and force sensing device 1100 including any capacitance imposed on the integrated touch sensing and force sensing device 1100 due to the proximity of a finger. The phase sensitive demodulation of the touch signal in block 1410 occurs at the same frequency as the frequency of the stimulation signal circuit $V_{STIM}$. The operation of the force processing channel is the same as that described in conjunction with the embodiments of FIGS. 14-17.

The decimation and error correction block 1440 performs error correction on the force signals. Errors can be induced, for example, by non-linearities in the force processing channel, interferers (internal and external), parasitic effects, such as leakage currents induced by the amplifier 1426, or sensor effects, such as temperature induced sensor deformation. Example error correction techniques may include adaptive offset compensation, base-lining, and adaptive filtering as a function of parameters such as temperature.

Although FIGS. 14-17 and 19 depict a single receiver AFE channel, a single touch processing channel, a single force processing channel, a single power management channel, and a single demodulator channel, those skilled in the art will recognize that the integrated touch sensing and force sensing device can be operably connected to multiple processing channels. As one example, each intersection of a row electrode and a column electrode (see FIGS. 9 and 10) can be operably connected to a receiver AFE channel, a touch processing channel, and a force processing channel. In other words, multiples of the processing channels shown in FIGS. 14-17 and FIG. 19 may be operably connected to each intersection of a row electrode and a column electrode.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:
1. An electronic device, comprising:
an integrated touch sensing device and force sensing device, comprising:
an input surface;
a force-sensitive layer attached to the input surface;

a first electrode layer attached to a first surface of the force-sensitive layer, the first electrode layer comprising a set of discrete electrodes; and a second electrode layer attached to a second surface of the force-sensitive layer; and an analog front end (AFE) processing channel operably connected to the integrated touch sensing device and force sensing device, the AFE processing channel configured to process a touch signal that is based on a change in an electrical property between the first and the second electrode layers and configured to process a force signal that is based on an electrical property generated by the force-sensitive layer, the AFE processing channel comprising:

a receiver AFE channel operably connected to at least one respective discrete electrode in the set of discrete electrodes;

a touch processing channel operably connected to an output of the receiver AFE channel; and a force processing channel operably connected to the output of the receiver AFE channel.

2. The electronic device as in claim 1, wherein the receiver AFE channel comprises:

a first input of an amplifier operably connected to the at least one respective discrete electrode in the set of discrete electrodes;

a second input of the amplifier operably connected to a bias signal;

an analog-to-digital converter operably connected to an output of the amplifier; and a feedback capacitor connected between the first input of the amplifier and the output of the amplifier.

3. The electronic device as in claim 2, wherein:

the force processing channel comprises:

an error comparator operably connected to the output of the receiver AFE channel; and a decimation filter and error correction circuit operably connected to an output of the error comparator; and the AFE processing channel further comprises a feedback current digital-to-analog circuit operably connected between the output of the error comparator and the first input of the amplifier in the receiver AFE channel.

4. The electronic device as in claim 1, wherein the touch processing channel comprises:

a demodulator operably connected to the output of the receiver AFE channel; and an accumulator operably connected to an output of the demodulator.

5. The electronic device as in claim 1, wherein the force processing channel comprises a decimation filter and error correction circuit operably connected to the output of the receiver AFE channel.

6. The electronic device as in claim 5, wherein the decimation filter and error correction circuit corrects an error in the force signal produced using one of adaptive offset compensation, base-lining, and adaptive filtering.

7. The electronic device as in claim 1, wherein the set of discrete electrodes comprises a first set of discrete electrodes and the second electrode layer comprises a second set of discrete electrodes.

8. The electronic device as in claim 7, further comprising a touch transmitter channel operably connected to at least one respective discrete electrode in the second set of discrete electrodes, wherein the touch transmitter channel comprises:

a resistor operably connected between the at least one respective discrete electrode in the second set of discrete electrodes and an output of an amplifier; and a sigma delta analog-to-digital converter connected in parallel with the resistor.

9. The electronic device as in claim 1, further comprising a display layer connected to the force-sensitive layer.

10. The electronic device as in claim 9, wherein the electronic device comprises a smart telephone.

11. The electronic device as in claim 1, wherein the electronic device comprises a track pad.

12. An electronic device, comprising:

an integrated touch sensing device and force sensing device, comprising:

a force-sensitive layer;

a first electrode layer attached to a first surface of the force-sensitive layer, the first electrode layer comprising a set of discrete electrodes; and a second electrode layer attached to a second surface of the force-sensitive layer; and an analog front end (AFE) processing channel operably connected to the integrated touch sensing device and force sensing device, the analog AFE processing channel configured to process a touch signal received from the integrated touch sensing device and force sensing device and configured to process a force signal received from the integrated touch sensing device and force sensing device, the analog AFE processing channel comprising:

a receiver AFE channel operably connected to at least one respective discrete electrode in the set of discrete electrodes, the receiver AFE channel comprising:

an input of an amplifier operably connected to the at least one respective discrete electrode in the set of discrete electrodes;

an analog-to-digital converter operably connected to an output of the amplifier;

a feedback capacitor connected between the input of the amplifier and the output of the amplifier; and a servo/sigma delta analog-to-digital converter connected in parallel with the feedback capacitor, wherein the amplifier and the feedback capacitor process the touch signal and function as an integrator for the servo/sigma delta analog-to-digital converter; and a touch processing channel operably connected to an output of the receiver AFE channel.

13. The electronic device as in claim 12, wherein:

the set of discrete electrodes of the first electrode layer comprises a first set of discrete electrodes;

the second electrode layer comprises a second set of discrete electrodes;

the amplifier comprises a first amplifier; and the electronic device further comprises a touch transmitter channel operably connected to at least one respective discrete electrode in the second set of discrete electrodes, the touch transmitter channel comprising:

a resistor operably connected between the at least one respective discrete electrode in the second set of discrete electrodes and an output of a second amplifier; and a sigma delta analog-to-digital converter connected in parallel with the resistor.

14. The electronic device as in claim 12, wherein the touch processing channel comprises:

a demodulator operably connected to the output of the receiver AFE channel; and an accumulator operably connected to an output of the demodulator.

15. The electronic device as in claim 12, further comprising a touch power management channel operably connected to an output of the servo/sigma delta analog-to-digital converter.

16. The electronic device as in claim 12, further comprising a demodulator channel operably connected to an output of the servo/sigma delta analog-to-digital converter.

17. The electronic device as in claim 16, further comprising a mechanical oscillator operably connected between the force-sensitive layer and the demodulator channel.

18. The electronic device as in claim 17, wherein the mechanical oscillator is amplitude modulated to produce haptic feedback.

19. An electronic device, comprising:
 an integrated touch sensing device and force sensing device, comprising:
  a force-sensitive layer;
  a first electrode layer attached to a first surface of the force-sensitive layer, the first electrode layer comprising a first set of discrete electrodes; and
  a second electrode layer attached to a second surface of the force-sensitive layer, the second electrode layer comprising a second set of discrete electrodes;
 a touch transmitter channel operably connected to at least one respective discrete electrode in the second set of discrete electrodes; and
 an analog front end (AFE) processing channel operably connected to the integrated touch sensing device and force sensing device, the AFE processing channel configured to process a touch signal that is received from the integrated touch sensing device and force sensing device and configured to process a force signal that is received from the integrated touch sensing device and force sensing device, the AFE processing channel comprising:
  a receiver AFE channel operably connected to at least one respective discrete electrode in the first set of discrete electrodes; and
  a touch processing channel operably connected to an output of the receiver AFE processing channel.

20. The electronic device as in claim 19, wherein the touch processing channel comprises:
 a demodulator operably connected to the output of the receiver AFE channel; and
 an accumulator operably connected to an output of the demodulator.

21. The electronic device as in claim 19, further comprising a force processing channel operably connected to the output of the receiver AFE channel.

22. The electronic device as in claim 21, wherein the force processing channel comprises a decimation filter and error correction circuit operably connected to the output of the receiver AFE channel.

23. The electronic device as in claim 19, further comprising a touch power management channel operably connected to the output of the receiver AFE channel.

24. The electronic device as in claim 19, further comprising a demodulator channel operably connected to the output of the receiver AFE channel.

25. The electronic device as in claim 24, further comprising a mechanical oscillator operably connected between the force-sensitive layer and the demodulator channel.

* * * * *